C. L. SMITH.
RACK FOR HANDLING PLATE GLASS.
APPLICATION FILED JUNE 29, 1916.
1,213,032.
Patented Jan. 16, 1917.
3 SHEETS—SHEET 3.
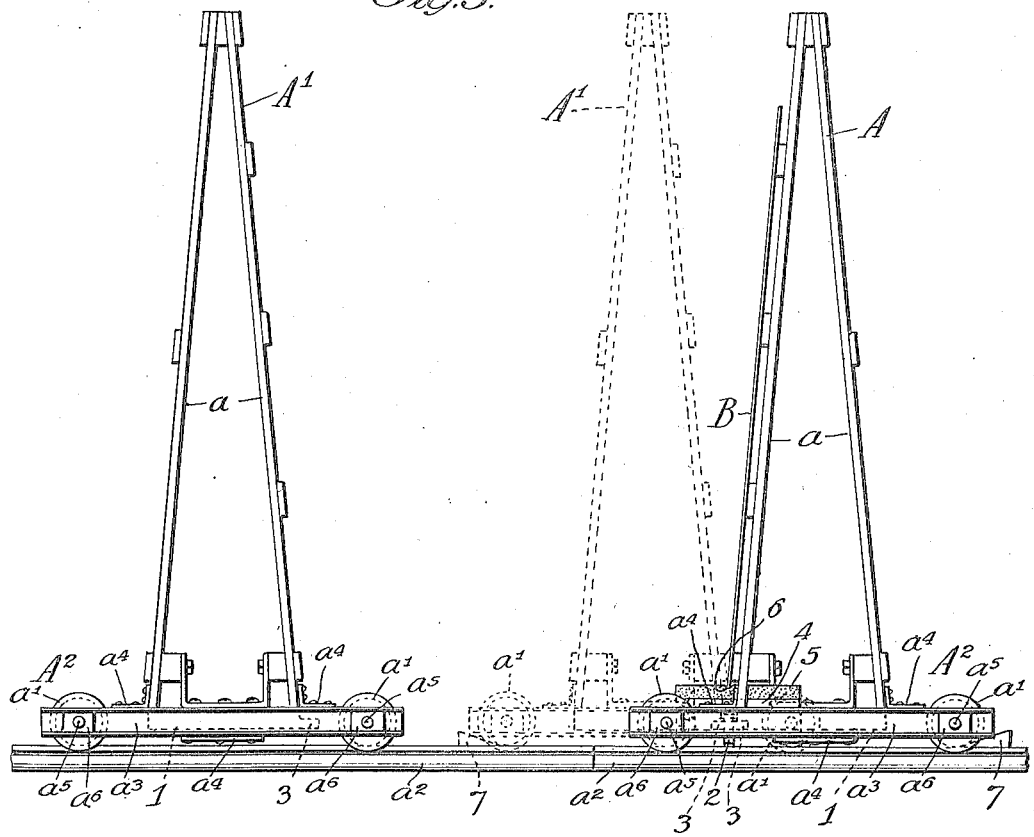
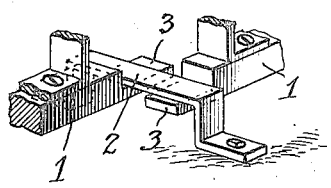
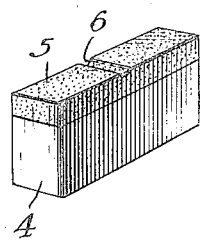
Witnesses
Martin H. Olsen.
Edna A. Olsen.
Inventor
Carlton L. Smith,
By Jas. E. Walds,
Atty.

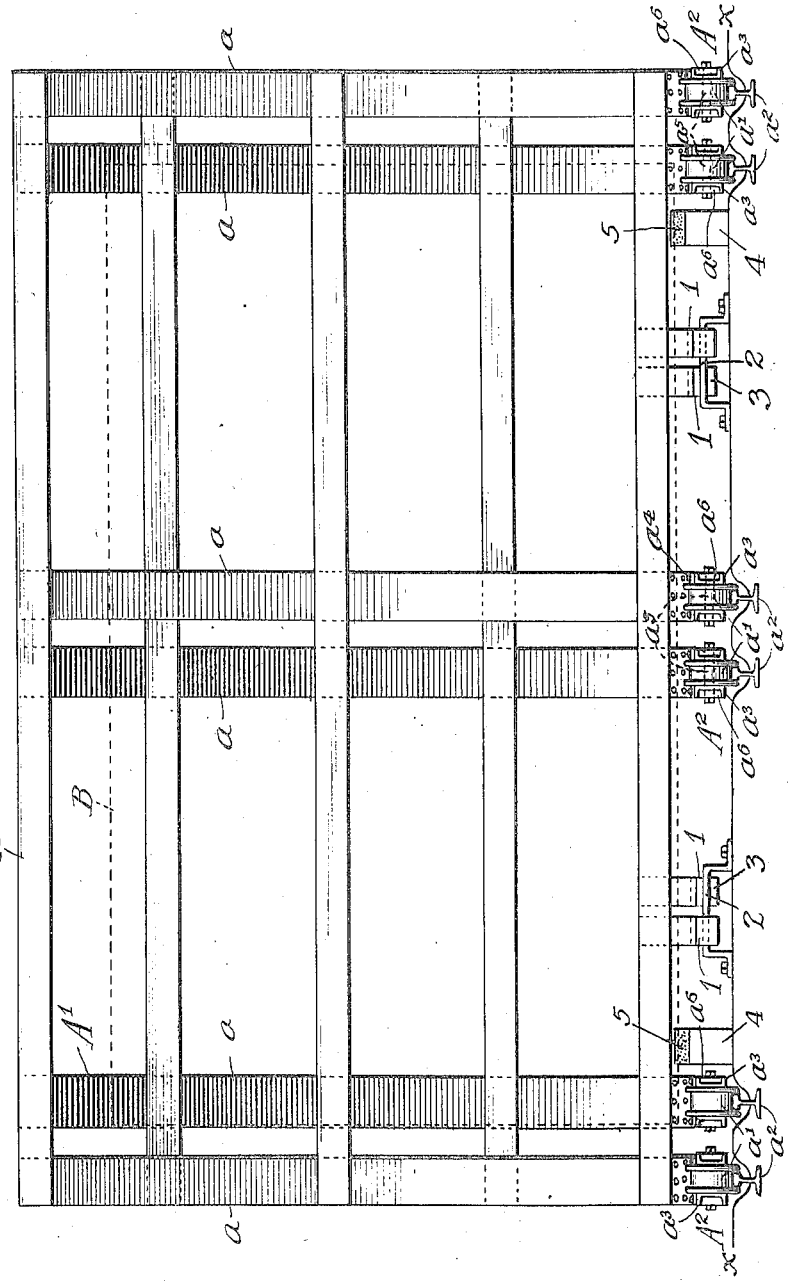

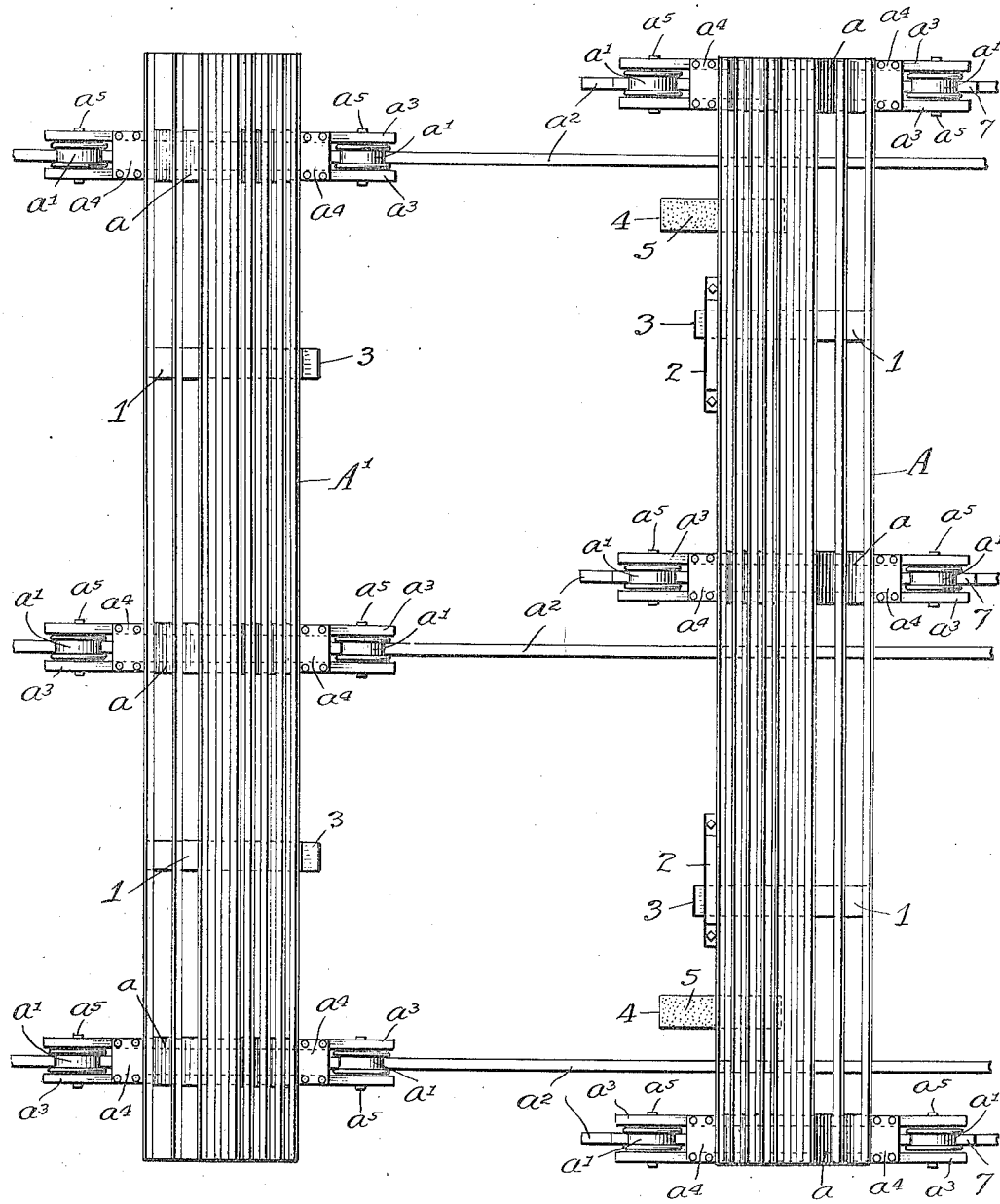

UNITED STATES PATENT OFFICE.

CARLTON L. SMITH, OF SAGINAW, MICHIGAN, ASSIGNOR TO SAGINAW PLATE GLASS COMPANY, OF SAGINAW, MICHIGAN, A CORPORATION OF MICHIGAN.

RACK FOR HANDLING PLATE-GLASS.

1,213,032.    Specification of Letters Patent.    Patented Jan. 16, 1917.

Application filed June 29, 1916. Serial No. 106,706.

*To all whom it may concern:*

Be it known that I, CARLTON L. SMITH, a citizen of the United States, and resident of Saginaw, in the county of Saginaw and State of Michigan, have invented a new and useful Improvement in Racks for Handling Plate-Glass, of which the following is a specification.

This invention relates to racks for handling plate glass.

As is well known to persons familiar with the manufacture of plate glass, the glass is cast in the form of plates of desired size and thickness. The sides of these plates are rough and are later finished by grinding and polishing the sides thereof by means of suitable machinery provided for the purpose, which comprise suitable rotary tables to the surfaces of which the plates of glass are secured in flatwise position, leaving the surface of the glass, which is to be polished, exposed.

After one side of the plate of glass is ground and polished, it is necessary to detach said plate of glass from the grinding and polishing table and relay it on the table with its remaining rough side exposed, which is then ground and polished in turn. At the present time, glass lifting machines are used almost universally for thus lifting and relaying large plates of glass. The operation of relaying necessarily involves turning the plates of glass in some manner to present the unpolished side of the plate of glass to the lifter. Heretofore, so far as I am aware, no suitable means have been provided or devised for thus turning the plates of glass to present different sides thereof to the lifting machine and the operation has been slow, quite laborious and involved considerable danger of breaking the glass.

The object of the present invention, therefore, is to provide racks whereby plates of glass of any size may be quickly, conveniently and safely turned to expose different sides thereof for any purpose. To this end a plate glass rack of my invention comprises the various features, combinations of features and details of construction hereinafter described and claimed.

In the accompanying drawings, in which my invention is fully illustrated, Figure 1 is a side view of racks for handling plate glass embodying my invention. Fig. 2 is a top plan view thereof. Fig. 3 is an end view thereof. Fig. 4 is an enlarged fragmentary, perspective view of the stops which define the operative positions of the racks; and Fig. 5 is an enlarged perspective view of the movable blocks upon which the plates of glass rest when in said racks.

Referring now to the drawings, in which I have shown what I consider to be the preferable embodiment of my invention, A, A' designate two glass racks which are supported so as to be bodily movable toward and from each other. Said racks may be made of either wood or suitable structural iron shapes and, as regards their usual features and excepting as hereinafter particularly described, may be of any usual or approved construction and will be readily understood by persons familiar with the art without a further description thereof in detail. While my invention contemplates supporting said racks A, A' in any desired manner so that they will be bodily movable toward and from each other, I prefer the construction shown in the drawings, in which the standards of the rack designated $a$, are mounted on separate trucks, designated as a whole $A^2$, the wheels $a'$ of which run on tracks $a^2$ laid in or upon a suitable foundation, as the floor, the line of which is indicated at $x$. Separate tracks, disposed out of line with each other, are provided for the trucks of each rack, thereby providing for moving said racks A, A' into position with their bases overlapping so as to bring the lower ends of adjacent sides thereof substantially coincident with each other. As shown, the trucks $A^2$ each consists of channel bars $a^3$ secured together in spaced relation, with their plane sides disposed inwardly, by plates $a^4$ riveted or otherwise rigidly secured thereto. As shown, the standards $a$ of said racks are made of wood, the lower ends thereof being bolted to angles secured to the truck members $a^3$. As shown, the plates for thus securing said standards $a$ to the truck frame members $a^3$ consist of the plates $a^4$, which connect said members $a^3$ and which are made in the form of angles. The truck wheels $a'$ are rotatably mounted on shafts $a^5$ mounted to turn freely in bearings formed in bearing block $a^6$ riveted or otherwise rigidly secured in the channels of the truck frame members $a^3$. Movement of said racks A, A' toward each other is limited and their positions relatively to each other defined by means of stops 1 on said racks and fixed stops 2 with which said stops 1 are adapted to contact. As shown, the same stops 2 are used for both racks and consist of a bar supported a short distance above the floor level $x$ adapted to receive the reduced end portions 3 of the stops 1 and thus support said racks from tipping away from each other, as they might otherwise tend to do in use. Supported on the floor $x$ between the racks A, A' are blocks 4, the positions of said blocks being such that when said racks are in positions of nearest approach to each other, defined by engagement of the stops 1 on said racks with the fixed stops 2, the centers of said blocks will coincide substantially with the supports for the lower edge of a plate of glass supported by either of said racks.

The blocks 4 are of such height that a plate of glass resting thereon will clear the trucks A² and felt pads 5 are preferably secured to the upper surfaces thereof on which the plates of glass rest in edgewise position, thus reducing the liability of breaking said plates of glass in handling. Also, to prevent slipping of the edges of the plates of glass in said blocks, the felt pads 5 thereon are preferably provided with substantially central grooves 6 adapted to receive the lower edges of the plates of glass. In use, the blocks 4 are preferably placed near the ends of the plate of glass supported by said racks, said blocks being preferably loose so as to be freely adjustable transversely of said racks, thus adapting said racks for holding plates of glass of almost any size.

A glass rack of my invention also comprises means for securing said racks A, A' in adjusted position. As shown, said means consist of wedge-shaped blocks 7 adapted to be inserted back of the truck wheels $a'$ and thus lock the trucks A² and thus the racks A, A' from movement to effect disengagement of the stops 1 and 2. My invention, however, contemplates the use of any other means for thus locking said racks in position, of which many different forms will readily suggest themselves to skilled mechanics.

To illustrate the manner of using my improved turning racks for turning a plate of glass so as to expose different sides thereof, I will describe the same as applied for turning a plate of glass, indicated at B, one side of which has been ground and polished, to present or expose the opposite side thereof to the grinding and polishing devices. One side of said plate of glass B having been ground and polished, it is detached from the grinding table, not shown, and is raised from the table and deposited in one of the racks A, A' by means of a suitable lifting machine. What I now consider a preferable lifting machine for this purpose is a machine of the general type which forms the subject-matter of U. S. Letters Patent No. 1,125,752, to which reference is made for a full description thereof.

Assuming that the plate of glass B is to be deposited in the rack A, said rack is moved into position with the stops 1 thereon in engagement with the fixed stops 2 and is locked against movement to disengage said stops. The rack A' is moved back substantially into the position shown in full lines in Fig. 1, to provide ample space at the side of the rack A, in which said plate of glass is to be placed, to permit the lifting machine carrying said plate of glass to pass freely between said racks. The plate of glass is then deposited in the rack A in the usual way and the machine withdrawn from between said racks. The rack A' is then moved up into the position shown in dotted lines, Fig. 1, with the stops 1 thereon in engagement with the fixed stops 2, in which position the grooves 6 in the blocks 4, in which the lower edge of the plate of glass B rests, will be at the apex of the angle formed by the adjacent sides of said racks. Said rack A' is then locked in position and the plate of glass turned—which can be done quickly and safely by hand—so that its polished side will rest in contact with said rack A'. The rack A is then moved back out of the way, the lifting machine moved into position to engage the exposed side of the plate of glass, which is now its rough or unfinished side, and the plate of glass lifted out of said rack and deposited on the grinding and polishing table with its unfinished side exposed. Said racks may, in like manner, be used for washing large plates of glass by depositing said plates in one of said racks, washing the exposed side thereof, moving the other rack into position, transfering said plate of glass thereto, and then washing the opposite side of said glass which is then its exposed side.

I claim:—

1. An apparatus for handling plate glass comprising movable racks constructed and arranged to be positioned facing each other with the bottoms of their adjacent sides in close proximity, substantially as described.

2. An apparatus for handling plate glass comprising movably supported racks constructed and arranged to be positioned facing each other with the bottoms of their adjacent sides in close proximity, substantially as described.

3. An apparatus for handling plate glass comprising racks, trucks on which said racks are supported, and tracks for said trucks, constructed and arranged to permit said racks to be moved into position facing each other with the bottoms of their adjacent sides in close proximity, substantially as described.

4. An apparatus for handling plate glass, comprising racks, trucks on which said racks are supported and tracks on which said trucks are movable toward and from each other, the tracks for the trucks which support different racks being arranged out of line to permit said racks to be moved into positions with the bottoms of their adjacent sides in close proximity, substantially as described.

5. An apparatus for handling plate glass, comprising movable racks constructed and arranged to be positioned facing each other with the bottoms of their adjacent sides in close proximity, and separate supports on which the lower edges of the plates of glass are adapted to rest, substantially as described.

6. An apparatus for handling plate glass, comprising movable racks, means for securing said racks in position facing each other with the bottoms of their adjacent sides in close proximity, and separate supports on which the lower edges of the plates of glass are adapted to rest, substantially as described.

7. An apparatus for handling plate glass, comprising movable racks constructed and arranged to be positioned facing each other with the bottoms of their adjacent sides in close proximity, and separate adjustable supports on which the lower edges of the plates of glass are adapted to rest, substantially as described.

8. An apparatus for handling plate glass, comprising movable racks constructed and arranged to be positioned facing each other with the bottoms of their adjacent sides in close proximity, and loose blocks on which the lower edges of the plates of glass are adapted to rest, substantially as described.

9. An apparatus for handling plate glass, comprising movably supported racks, means for securing said racks in position facing each other with the bottoms of their adjacent sides in close proximity, and transfer supports on which the lower edges of the plates of glass are adapted to rest, substantially as described.

10. An apparatus for handling plate glass, comprising movably supported racks, stops which limit the movement and define the operative positions of said racks, and means to prevent tipping of said racks, substantially as described.

11. An apparatus for handling plate glass, comprising movably supported racks and stops which limit the movement and define the operative positions of said racks, said stops comprising interlocking parts constructed and arranged to prevent tipping of said racks, substantially as described.

12. An apparatus for handling plate glass, comprising racks, trucks on which said racks are supported, tracks for said trucks constructed and arranged to permit said racks to be moved into position facing each other with the bottoms of their adjacent sides in close proximity, means for locking said trucks against movement, and transfer supports for the lower edges of the plates of glass, substantially as described.

13. An apparatus for handling plate glass, comprising racks, trucks on which said racks are supported, tracks on which said trucks are movable toward and from each other, the tracks for the trucks which support different racks being arranged out of line to permit said racks to be moved into positions with the bottoms of their adjacent sides in close proximity, and means for locking said trucks against movement and to prevent tipping of said racks, substantially as described.

In testimony, that I claim the foregoing as my invention, I affix my signature in the presence of two subscribing witnesses this 19 day of June, A. D. 1916.

CARLTON L. SMITH.

Witnesses:
C. E. ESTABROOKS,
ALBERT C. BORDEN.